US012680587B2

(12) United States Patent
Sin Xicola

(10) Patent No.: US 12,680,587 B2
(45) Date of Patent: Jul. 14, 2026

(54) UNDER-LAYER FOR A BRAKE PAD OF A BRAKE DISC ROTOR

(71) Applicants:ITT Italia S.R.L., Lainate (IT); ITT Manufacturing Enterprises LLC, Wilmington, DE (US)

(72) Inventor: Agustin Sin Xicola, Milan (IT)

( * ) Notice: Subject to any disclaimer, the term of this patent is extended or adjusted under 35 U.S.C. 154(b) by 691 days.

(21) Appl. No.: 17/921,319

(22) PCT Filed: May 19, 2021

(86) PCT No.: PCT/US2021/033203
    § 371 (c)(1),
    (2) Date: Oct. 25, 2022

(87) PCT Pub. No.: WO2021/236798
    PCT Pub. Date: Nov. 25, 2021

(65) Prior Publication Data
    US 2023/0175569 A1    Jun. 8, 2023

(30) Foreign Application Priority Data

May 22, 2020    (IT) ........................ 102020000012001

(51) Int. Cl.
    *F16D 69/02*    (2006.01)
    *C09K 3/14*     (2006.01)
    *F16D 69/00*    (2006.01)
    *F16D 69/04*    (2006.01)

(52) U.S. Cl.
    CPC ............ *F16D 69/026* (2013.01); *C09K 3/149* (2013.01); *F16D 2069/006* (2013.01); *F16D 2069/045* (2013.01)

(58) Field of Classification Search
    CPC ............ F16D 69/026; F16D 2069/006; F16D 2069/045; C09K 3/149
    See application file for complete search history.

(56) References Cited

U.S. PATENT DOCUMENTS 3,959,194  A  *  5/1976  Adelmann ............ F16D 69/022
                                                    51/299
    4,508,855  A  *  4/1985  Peters .................... F16C 33/201
                                                    523/156
    5,641,444  A     6/1997  Fujikawa et al.
    5,811,042  A     9/1998  Hoiness
    6,451,872  B1 *  9/2002  Yamane .................. F16D 69/02
                                                    523/156
    (Continued)

FOREIGN PATENT DOCUMENTS

CN        111043202  A      4/2020
    EP          3130817  A1     2/2017
                    (Continued)

OTHER PUBLICATIONS

Machine translation of WO 2020-021646 (Year: 2020).*
                    (Continued)

*Primary Examiner* — Doris L Lee
(74) *Attorney, Agent, or Firm* — Turk IP Law, LLC

(57)    ABSTRACT

Technologies are generally described for a composition for an under-layer of a brake pad of a brake disc rotor. The composition may include a fiber pack, a powdered rubber, at least one binder, and at least one filler, wherein the fiber pack includes aramid fibers up to about 3 wt %.

12 Claims, 13 Drawing Sheets

(56)                    References Cited

U.S. PATENT DOCUMENTS

| | | | |
|---|---|---|---|
| 2002/0006981 A1 | 1/2002 | Nakamura et al. | |
| 2004/0241429 A1 | 12/2004 | Suzuki et al. | |
| 2005/0081482 A1* | 4/2005 | Lembo | E04B 1/7662 |
| | | | 52/782.1 |
| 2007/0065668 A1 | 3/2007 | Idei | |
| 2007/0082975 A1 | 4/2007 | Kobayashi et al. | |
| 2007/0117881 A1 | 5/2007 | Watanabe et al. | |
| 2010/0084232 A1* | 4/2010 | Subramanian | F16D 69/026 |
| | | | 188/251 A |
| 2011/0189460 A1* | 8/2011 | Chavdar | F16D 69/026 |
| | | | 428/292.1 |
| 2011/0297496 A1 | 12/2011 | Subramanian | |
| 2014/0190777 A1* | 7/2014 | Dallegrave | F16D 69/026 |
| | | | 241/24.1 |
| 2016/0289442 A1* | 10/2016 | Takada | C08L 61/06 |
| 2018/0313420 A1* | 11/2018 | Shimada | F16D 69/026 |
| 2019/0360544 A1 | 11/2019 | Santamaria Razo et al. | |

FOREIGN PATENT DOCUMENTS

| | | | |
|---|---|---|---|
| EP | 3321338 A1 | 5/2018 | |
| EP | 3594308 A1 | 1/2020 | |
| JP | 2782105 B | 7/1998 | |
| JP | 2838304 B | 12/1998 | |
| JP | 2000339873 A | 12/2000 | |
| JP | 2008222730 A | 9/2008 | |
| JP | 2009263577 A | 11/2009 | |
| JP | 2018002775 A | 1/2018 | |
| WO | 2016121748 A1 | 8/2016 | |
| WO | 2019082350 A1 | 5/2019 | |
| WO | WO-2020021646 A1 * | 1/2020 | F16D 65/092 |

OTHER PUBLICATIONS

International Search Report and Written Opinion for International App No. PCT/US21/33203, pp. 9.

The Second Office Action, including a supplementary search report as issued, 9 pages, mailed on Jul. 10, 2025.

English translation of the First Office Action, 16 pages, mailed on Mar. 11, 2025.

Office Action; Japanese Patent Application No. 2022-570661, mailed Mar. 12, 2025, 6 pages.

EPO, EP Search Report, Application No. 21808042.2, Oct. 10, 2024.

Office Action Japanese Patent Application No. 2022-570661, 2 pages, mailed Aug. 26, 2025.

* cited by examiner

100

102

104

106

108

110

UNDER-LAYER FOR A BRAKE PAD OF A BRAKE DISC ROTOR

CROSS-REFERENCE TO RELATED APPLICATIONS

This application is a U.S. National Stage filing under 35 U.S.C. § 371 of International Application PCT/US21/33203, filed May 19, 2021, which claims priority to Italian Patent Application No. 102020000012001 filed on May 22, 2020 by the same inventors. The entirety of the disclosures of the priority application are incorporated by reference herein.

BACKGROUND

Unless otherwise indicated herein, the materials described in this section are not prior art to the claims in this application and are not admitted as prior art by inclusion in this section.

Vehicle brake systems often include brake rotors and brake pads. The brake pads may be a significant source of noise generated in the brake system. Noise and vibrations are important considerations in automotive brake systems.

A typical brake pad in a vehicle brake system may have a sandwiched structure. The sandwich structure may include a friction material of approximately 10 mm followed by an under-layer of approximately 3 mm, a rigid back plate and a shim. The friction members engage a surface of the brake disc rotors to generate friction to slow the speed of the vehicle. The under-layer provided between the back plate and the friction material improve the bonding between the backplate and the friction material and may improve the performance of the friction material. The under-layer helps prevent the heat generated by friction from deteriorating the bond between the friction material and the back plate. The under-layer also may be used to reduce the noise generated by the vibration of the friction material.

SUMMARY

According to some examples, a composition for an under-layer of a brake pad is described. The composition may include a fiber pack; a powdered rubber; at least one binder; and at least one filler, where the fiber pack contains aramid fibers in a range from about 0.1 wt % to about 3%.

According to other examples, the fiber pack may include acrylic fibers, aramid fibers, and inorganic mineral fibers. The acrylic fibers may include acrylic poly acrylonitrile pulp (PAN), the aramid fibers comprise poly(p-phenylene tere-phthalamide) fibers (PPTA), and the inorganic mineral fibers comprise natural stonewool fibers. The fiber pack may include acrylic fibers in a range from about 0.5 wt % to about 7 wt %, aramid fibers in a range from about 0.1 wt % to about 3 wt %, and inorganic mineral fibers in a range from about 0.5 wt % to about 7 wt %.

According to further examples, the powdered rubber may be from about 5 wt % to about 25 wt % of the composition, be compounded with or without an inorganic filler, and include one or more of nitrile rubber (NBR), ethylene propylene rubber (EPM), ethylene propylene diene mono-mer rubber (EPDM), styrene-butadiene rubber (SBR). The powdered rubber may have an average diameter in a range from about 0.3 mm to about 0.7 mm. The at least one binder may include a mixture of phenol-formaldehyde resins (PF Novolak) and Hexmethylene Tetramine (HMT). The at least one filler may include barium sulfate. The composition may further include an organic pigment phthalocyanine. The composition may also include steel fibers with an aspect ratio from about 20 to about 100.

According to other examples, a brake pad for a vehicle is described. The brake pad may include a metal back plate; a friction material; and an under-layer interposed between the metal back plate and the friction material. The under-layer may include a fiber pack; a powdered rubber; at least one binder; and at least one filler, where the fiber pack includes aramid fibers in a range from about 0.1 wt % to about 3%.

According to some examples, the fiber pack of the under layer may include acrylic fibers, aramid fibers, and inorganic mineral fibers. The fiber pack of the under layer may include acrylic fibers in a range of about 1 wt % to about 4 wt %, aramid fibers in a range of about 0.5 wt % to about 1 wt %, and inorganic mineral fibers in a range of about 1 wt % to about 4 wt %. The acrylic fibers may include acrylic poly acrylonitrile pulp, the aramid fibers comprise poly(p-phe-nylene terephthalamide) fibers, and the inorganic mineral fibers comprise natural stonewool fibers.

According to other examples, the under-layer may have a shear strength in a range of about 35 kN to about 60 kN at about room temperature. The under-layer may have a shear strength in a range of about 35 kN to about 60 kN after being exposed at a temperature of about 300° C. for 1 h. The under-layer may have a specific shear strength in a range of about 300 $N/cm^2$ to about 600 $N/cm^2$ at about room tem-perature. The under-layer may have a compressibility in a range of about 0.08 mm to about 0.12 mm at about room temperature. The under-layer may have a compressibility in a range of about 0.13 mm to about 0.15 mm at a temperature of about 400° C. The under-layer may have a noise 10% below average, a hot noise of 4.4% below average, a cold noise of 10.2% below average, and a total noise of 5.7% below average.

According to further examples, a method of preparing an under-layer for a brake pad is described. The method may include providing a fiber pack comprising about 1 to 4 wt % of acrylic fibers, about 0.5 to 1 wt % of aramid fibers, and about 1 to 4 wt % of inorganic mineral fibers; providing a powdered rubber compounded with an inorganic filler from about 0% to about 80%; and dry-mixing the fiber pack, the rubber powder, at least one filler and the at least one binder.

According to other examples, providing the powdered rubber compounded with an inorganic filler may include providing the powdered rubber that has an average particle diameter of about 0.3 mm to 1.00 mm. Providing the powdered rubber compounded with an inorganic filler may include providing the powdered rubber that has an average diameter in a range from about 0.3 mm to about 0.7 mm. Mixing the fiber pack, the rubber powder, at least one filler and at least one binder may include mixing the fiber pack, the rubber powder, at least one filler and at least one binder in a Loedige mixer for about 5 minutes to about 20 minutes.

BRIEF DESCRIPTION OF THE DRAWINGS

The foregoing and other features of this disclosure will become more fully apparent from the following description and appended claims, taken in conjunction with the accom-panying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
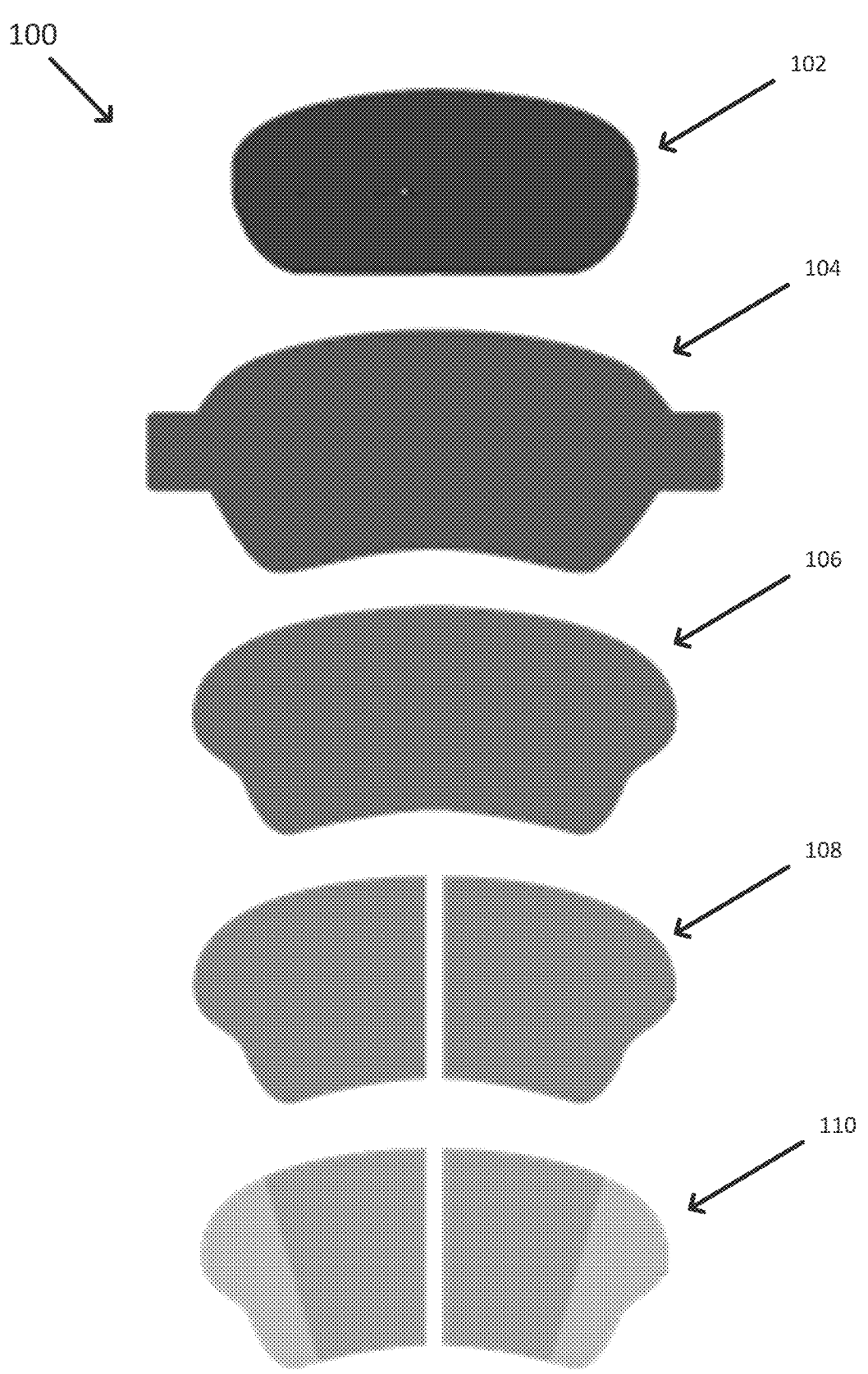
FIG. 1 illustrates an example brake pad including an under-layer with low wt % of aramid fibers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a composition, an under-layer, a brake pad, and a method of synthesizing an under-layer.

Briefly stated, technologies are generally described for a composition for an under-layer of a brake pad of a brake disc rotor. The composition may include a fiber pack, a powdered rubber, at least one binder, and at least one filler, wherein the fiber pack may include aramid fibers up to about from 0.1 wt % to 3 wt %, preferably less than 1 wt %.

The present disclosure recognizes that the under-layers can be synthesized using a composition with a lower aramid fiber content, thus reducing the cost per kilogram of the under-layer. The choice of the raw materials may enable a decreased quantity of expensive aramid fibers, up to about from 0.1 wt % to 3 wt %, preferably less than 1 wt %, while maintaining the shear strength of the brake pads.

Some example benefits of the presently disclosed composition are that it enables better process control in manufacturing a brake pad with a higher flexibility when compared to a conventional brake pad manufacturing process. For example, the disclosed composition enables the preparation of the under-layer using a Loedige mixer instead of a more expensive Krupp mixer while preserving many of the damping and Noise, Vibration and Hardness (NVH) properties of a traditional under-layer.

An example under-layer may consist of fibers, binders, and powder and/or granular fillers. The under-layer may have viscous behavior polymers that are able to convert the mechanical energy into thermal energy. The fibers in the under-layer may be used to resist the shear force generated between the surface of the brake disk rotor and the back plate when a frictional force is applied. Aramid fibers with fibrillated morphology are commonly used to enhance the mechanical strength of the under-layer. Aramid fibers have excellent thermo-mechanical features. However, aramid fibers are expensive and may increase the overall cost per of the under-layer.

The presently disclosed under-layer has a heat insulation effect, a good bonding with the back plate, and an ability to compensate a performance weakness of a standard friction material. The under-layer made with the disclosed composition may also have a lower compressibility and a lower damping when compared to the conventional under-layers.

The thermo-mechanical properties of the presently disclosed under-layers were evaluated by measuring the shear strength at room temperature and also at 300° C., and then by studying the thermal degradation over five days this steady state condition. The brake pads made with the disclosed under-layer were tested in condition of high dynamic stress with a brake dynamometer (up to 600° C.). The main function of an under-layer is typically to provide noise-vibrations damping and also the compressibility comfort behavior, for this last property the measurement of the compressibility (Cpx) of the under-layer is important. With reference to FIG. 1, the Cpx measurement is carried out following the norm ISO 6310 B (K3 100 bar) on the entire brake pads, constituted by the friction material 108, the underlayer 106, and the backplate 104.

Additionally, the viscoelastic properties of the presently disclosed under-layers were studied with Dynamic Mechanical Thermal Analysis (DMTA) coupled with an analytical methodology based on the WLF theory and the time-temperature superposition principle. The study measures the damping ability of the under-layer composition in a wide range of frequencies and temperatures. The disclosed under-layers were subjected to different NVH test procedures in a brake dynamometer in order to measure the real dynamic noise behavior and to compare the performance the state of the art.

FIG. 1 is an example brake pad 100 including an under-layer 106 that is arranged according to aspects of the present disclosure. The example brake pad 100 includes a shim 102, a back plate 104, an under-layer 106, a friction material 108, and a friction surface 110. In some examples, brake pad 100 has a sandwiched structure. For example, the sandwiched structure may include friction material 108, which generates friction when urged to a surface of a brake disc rotor (not shown), followed by under layer 106 and then back plate 104.

In various examples, the shim 102 may be a thin layer of rubber that is positioned between the brake pad 100 and the brake disc rotor. This thin layer of rubber may correct for various imperfections in either of the surfaces (e.g., a surface of the rotor or a surface of the pad), which may cause noise in operation of the brakes. In some examples, the brake shim 102 may function as an anti-rattle pad.

In some examples, the back plate 104 may be a rigid material, such as steel. In various examples, the rigid material may include other metals, alloys, or other composite materials such as carbon fiber reinforced plastic (CFRP) or glass-reinforced plastic (GRP).

The under-layer 106 may include a composition that may include a fiber pack, a powdered rubber (in Loedige Mixer based under-layer applications), at least one binder, and at least one filler, wherein the fiber pack may include aramid fibers up to about from 0.1 wt % to 3 wt %, preferably less than 1 wt %. Additional examples concerning the under-layer materials will be discussed further below.

In various examples, the friction material 108 may be bound to the friction surface 110 that faces the brake disc rotor. The friction material 108 may be organic, ceramic or metallic material that has an appropriate friction characteristic for braking. Example organic friction materials may include a mixture of fibers and other materials such as rubber, carbon compounds, glass, fiberglass, and/or Kevlar, bound together with a resin. Example ceramic friction materials may be made from boron, silica, carbide, alumina, or zirconia and include aluminum oxide (Al$_2$O$_3$) and silicon dioxide (SiO$_2$). Example metal friction materials may include metal materials such as copper, iron, steel, graphite, brass, or other composite alloys bonded with resin.

Figure 2:
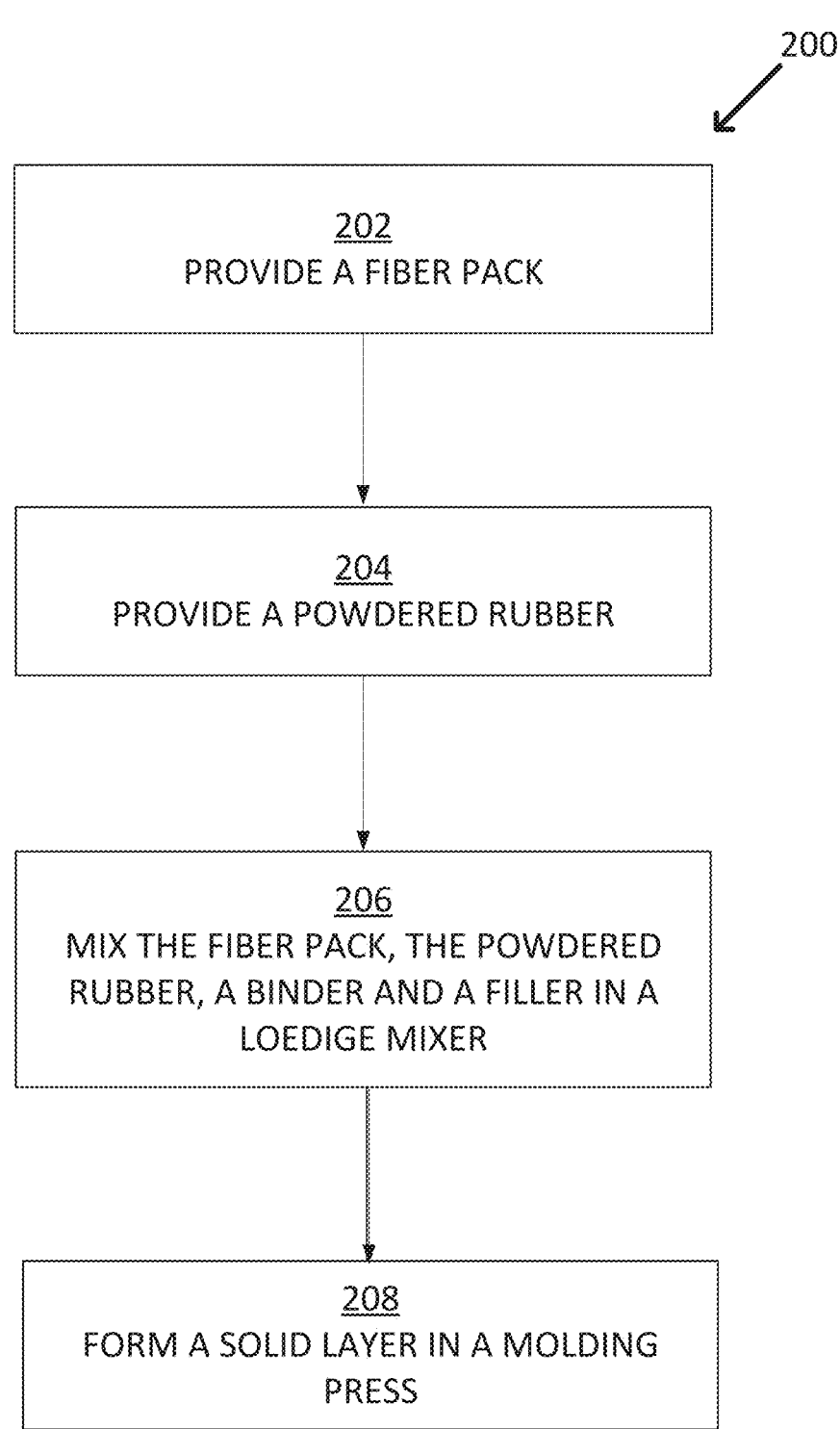
FIG. 2 is a flow chart illustrating a method for synthesizing a composition for an under-layer for a brake pad of a disc brake rotor.

FIG. 2 is a flow chart illustrating a method for preparing an under-layer that is arranged according to aspects of the present disclosure. The described method 200, may include block 202, "PROVIDE A FIBER PACK", block 204, "PRO-VIDE A POWDERED RUBBER", block 206, "MIX THE FIBER PACK, THE POWDERED RUBBER, A BINDER AND A FILLER IN A LOEDIGE MIXER", and block 208, "FORM A SOLID LAYER IN A MOLDING PRESS".

An example method may begin at block 202, where a fiber pack may be provided that includes acrylic fibers in a range from about 1 wt % to about 5 wt %, aramid fibers in a range from about 0.5 wt % to about 1 wt %, and inorganic mineral fibers in a range from about 1 wt % to about 5 wt %. In some illustrative examples, at block 202, the fiber pack may include about 0.5-5 wt % of acrylic fibers, about 0.5 to 3 wt % of aramid fibers and about 1 to 6 wt % of inorganic mineral fibers.

Block 202 may be followed by block 204, where a powdered rubber may be provided. In some examples the rubber may be compounded with an inorganic filler and may be provided in a powder form with an average particle diameter of about 0.5 mm. In some additional examples, the average particle diameter of the powder may also be in a range from about 0.3 mm to about 1 mm. In some examples, 10 wt % of the powdered rubber may be provided. In some other examples, the powdered rubber may be in a range from about 5 wt % to about 25 wt %. In some additional examples, the powdered rubber may be NBR.

Block 204 may be followed by block 206, where the fiber pack, the powdered rubber, a filler, and a binder may be mixed in a Loedige mixer. In some examples, the filler may be baryte. In some additional examples, about 5 to 25 wt % of filler may be used. In some other examples, the filler may be steel fiber and provided in a range from about 10 wt % to about 20 wt %.

In some examples, about 50-80 wt % of the steel fiber may be used. Conventionally the rubber materials used for the under-layer may be bulky pieces that can be machined in the Krupp mixers, which are costly and may generate high amount of heat during mixing which may cause thermal degradation of the raw materials. Furthermore, the bulky pieces of rubber may tend to agglomerate causing a poor control on particle size distribution and forming relatively large rubber particles having a diameter of more than 0.5 mm. However, since the rubber used is in a powdered form in the present disclosure, the mixing may be performed in a Loedige mixer that provides a gentle mixing with a better control on temperature of mixing. Mixing in the Loedige mixer may further preserve the damping and NVH properties of the under-layer prepared using the disclosed composition.

Block 206 may be followed by block 208, where the under-layer may be prepared by placing the fiber pack, the powdered rubber, the filler and the binder in a molding press and applying suitable pressure. Example pressure that may be provided during molding may be in a range from about 200 to 500 kg/cm'. Example temperature that may be provided during molding may be in a range from about 130 to 200° C. Table 1 presents the raw materials and example ranges in wt % for the disclosed under-layer.

TABLE 1

| Raw materials | Composition (wt %) |
|---|---|
| Aramid fibers | Up to 1 |
| Other Fibers | 45-80 |
| Rubber (NBR-EPM-EPDM-SBR) | 8-25 |
| Binder (resin) | 2-16 |
| Filler (barite-vermiculite) | 10-25 |

Figure 3:
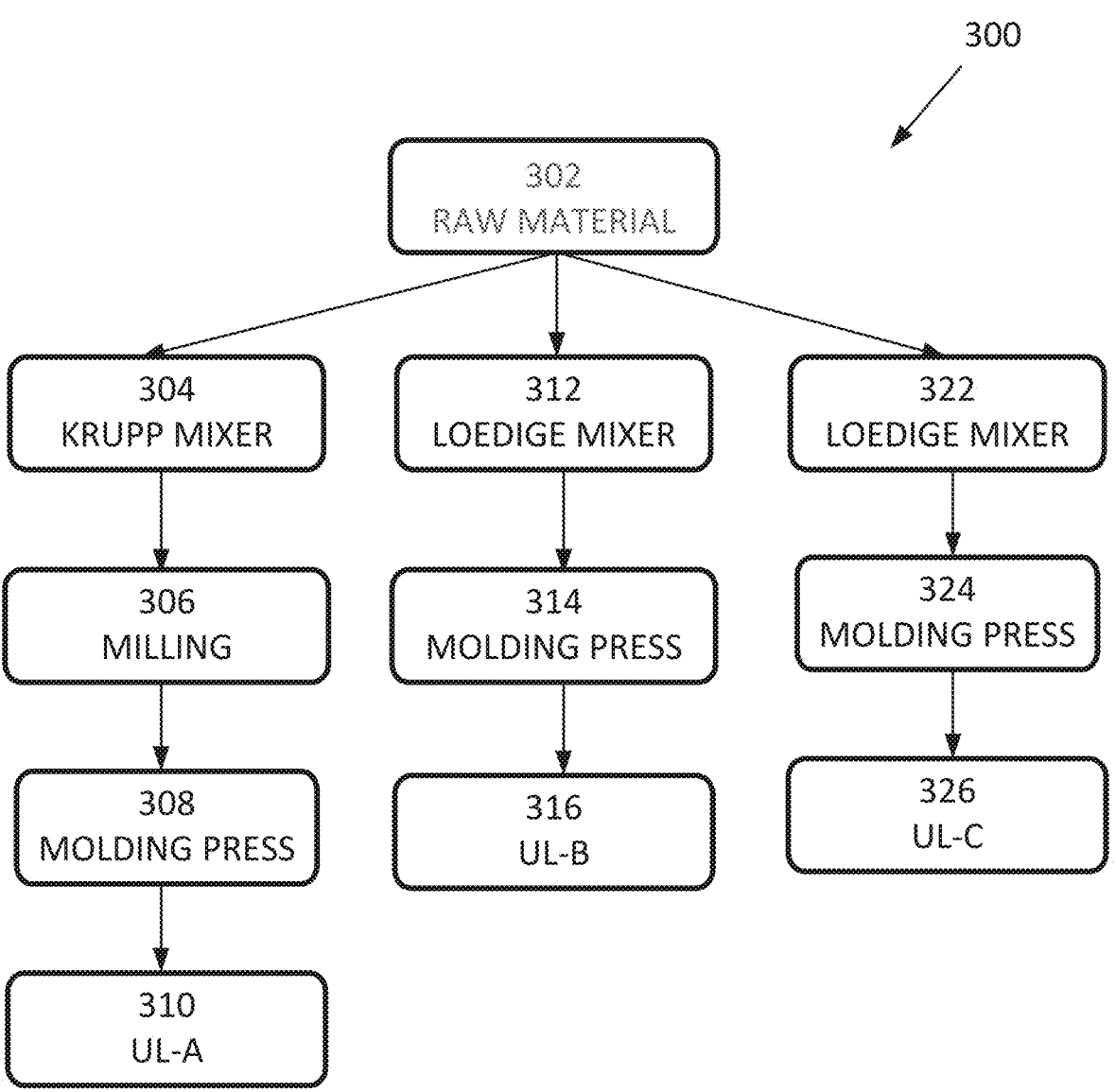
FIG. 3 is a schematic representation of systems and processes for synthesizing three under-layers using different compositions.

FIG. 3 is a schematic representation of systems and processes for synthesizing three under-layers using different compositions, all arranged in accordance with at least some embodiments described herein. The three under-layers for these examples are UL_A, UL_B and UL_C. The raw materials along with their wt % for UL_A are presented in Table 2. The raw materials along with their wt % for UL_B are presented in Table 3. The raw materials along with their wt % for UL_C are presented in Table 4.

Each of the described processes/systems 300, begin at block 302, "RAW MATERIAL", where the raw materials may be provided such as with a material loader, feeder or conveyor.

To prepare the reference UL_A, block 302 is followed by block 304, "KRUPP MIXER", where the raw materials shown in Table 2 are mixed in a Krupp mixer. Block 304 is followed by block 306, "MILLING", where the mixed materials from the Krupp mixer is conveyed to a milling machine to be ground into a fine powder. Block 306 is followed by block 308, "MOLDING PRESS", where the milled material is conveyed, transferred, or otherwise fed to a molding press to form a shaped piece of the UL_A material, which is provided at block 310.

The Krupp mixer can process most of the rubbers, including bulky rubber pieces. However, the investment cost of the Krupp mixer is significantly higher than the Loedige mixer. Further, heat may be generated while mixing the raw materials in the Krupp mixer, causing the thermal degradation. In general, using bulky rubbers in the Krupp mixer leads to broader particle size distribution of the rubber, which is then translated into worse dispersion of the underlayer mix. The UL_A formed has high damping capacity but has a poor under-layer distribution due to the rough control on rubber machining which ultimately lead to a wide particles size distribution. The dimension of the machine requires large production batches which limit the production flexibility and the number of producible mixes.

The Krupp technology is used the rubber in a bulk form, this type of fabrication of the under-layer implies to have a sponge like morphology of the UL product. Embodiments utilize Loedige mixer instead of Krupp mixer that implies to use the rubber in a powder like form of the UL. Thus, the sponge like is worse to disperse compared to powder like forms. The powder form is easier to disperse and achieves a good homogeneity in thickness of the brake pad.

TABLE 2

| Raw materials for UL_A | wt % |
|---|---|
| Aramid fibers | 10 |
| Other Fibers | 60 |
| Powdered rubber (NBR-EPM-EPDM-SBR) | 10 |
| Binder (resin) | 5 |
| Filler (barite-vermiculite) | 15 |

To prepare UL_B, block 302 is followed by block 312, "LOEDIGE MIXER", where the raw materials shown in Table 3 are mixed in the Loedige mixer. UL_B is a Loedige-based UL, thus it has advantages and disadvantages of a Loedige UL. However, UL_B has the same content of aramid fiber as UL_A. In the Loedige process, all the raw materials are already small enough to not need any kind of milling. After processing all the raw materials in the Loedige mixer the material is ready to use for the molding process at block 314, "MOLDING PRESS", transferred or otherwise fed to a molding machine to form a shaped piece of the UL_B material, which is provided at block 316.

The described process of using the Loedige mixer is flexible and has a performance comparable to UL_A. However, the process cost of the UL is higher respect to the UL_B.

TABLE 3

| Raw materials for UL_B | wt % |
|---|---|
| Aramid fibers | 10 |
| Other Fibers | 60 |
| Powdered rubber (NBR-EPM-EPDM-SBR) | 10 |
| Binder (resin) | 5 |
| Filler (barite-vermiculite) | 15 |

To prepare UL_C, block 302 may be followed by block 322, "LOEDIGE MIXER", where the raw materials shown in Table 4 are mixed in the Loedige mixer. Block 322 may be followed by block 324, "MOLDING PRESS", where the milled material is conveyed, transferred, or otherwise fed to a molding press to form a shaped piece of the UL_C material, which is provided at block 326.

The described process for UL_C has lower investment costs, better process control, and higher flexibility. However, Loedige mixer cannot handle bulky pieces of rubber, and the availability of powdered rubbers is limited. UL_C has a good under-layer distribution, a formulation flexibility and is cheaper compared to UL_A and UL_B. However, UL_C has a lower compressibility and lower damping but the lower cost compensates these disadvantages.

TABLE 4

| Raw materials for UL_C | wt % |
|---|---|
| Aramid fibers | 1 |
| Other Fibers | 69 |
| Rubber (NBR-EPM-EPDM) | 10 |
| Binder (resin) | 5 |
| Filler (barite-vermiculite) | 15 |

Figure 4A:
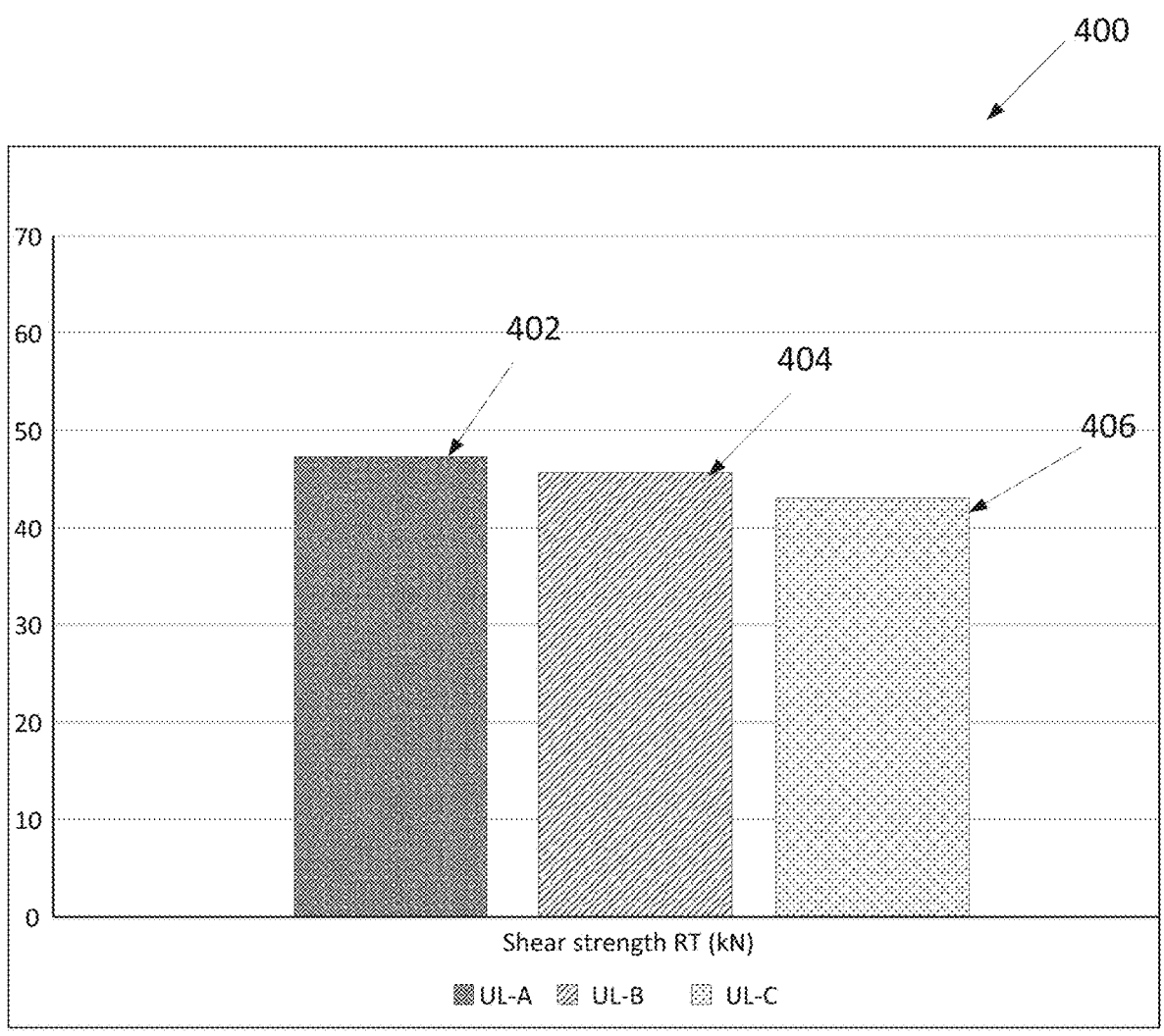
FIG. 4A is a graph illustrating shear strength of three different under-layers at room temperature.

FIG. 4A is a graph 400 illustrating shear strength (kN) of the three different under-layers measured at room temperature. The thermo-mechanical properties of the three under-layers were evaluated by measuring the shear strength at room temperature. The bar 402 is the shear strength of UL_A at room temperature. UL_A is a conventionally prepared under-layer. The bar 404 is the shear strength of UL_B at room temperature. UL_B is an under-layer made using the Loedige mixer and high content of aramid fiber. The column 406 is the shear strength of UL_C at room temperature. UL_C is the disclosed under-layer, made by using only Loedige mixer and low content of aramid fiber. The raw materials along with their wt % for the three under-layers are presented in Tables 2, 3 and 4.

As can be seen from the graph 400, the shear strength of the UL_C is comparable to the other two under-layers, illustrating the disclosed under-layer with the aramid fiber content up to about 1 wt % has similar shear strength as of the other two under-layers. The choice of the raw materials used for making UL_C thus allows a decreased amount of aramid fiber below about 10 wt %, while maintaining a good resistance of the brake pads in terms of the shear strength.

Figure 4B:
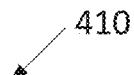
FIG. 4B is a graph illustrating shear strength of three different under-layers at a temperature of 300° C.
Figure 4B:
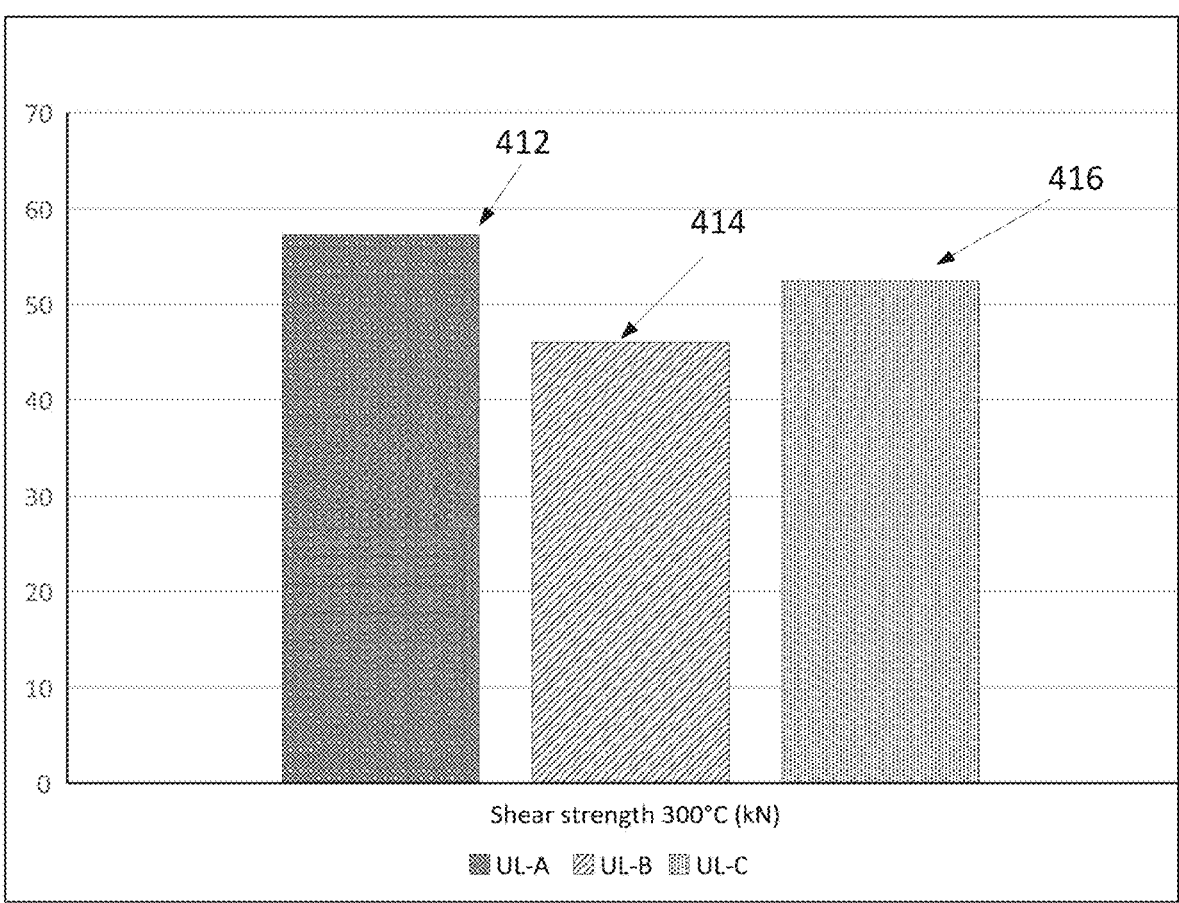

FIG. 4B is a graph 410 illustrating shear strength (kN) of the three different under-layers measured at room temperature after being kept at 300° C. in an oven for 1 h. The bar 412 is the shear strength of UL_A at room temperature after being kept at 300° C. in an oven for 1 h. The bar 414 is the shear strength of UL_B at room temperature after being kept at 300° C. in an oven for 1 h. The bar 416 is the shear strength of UL_C at room temperature after being kept at 300° C. in an oven for 1 h. It can be noted that the shear strength of the disclosed under-layer UL_C at room temperature after being kept at 300° C. in an oven for 1 h is higher than the shear strength of the under-layer UL_B having a high aramid fiber content of about 10 wt %.

Figure 4C:
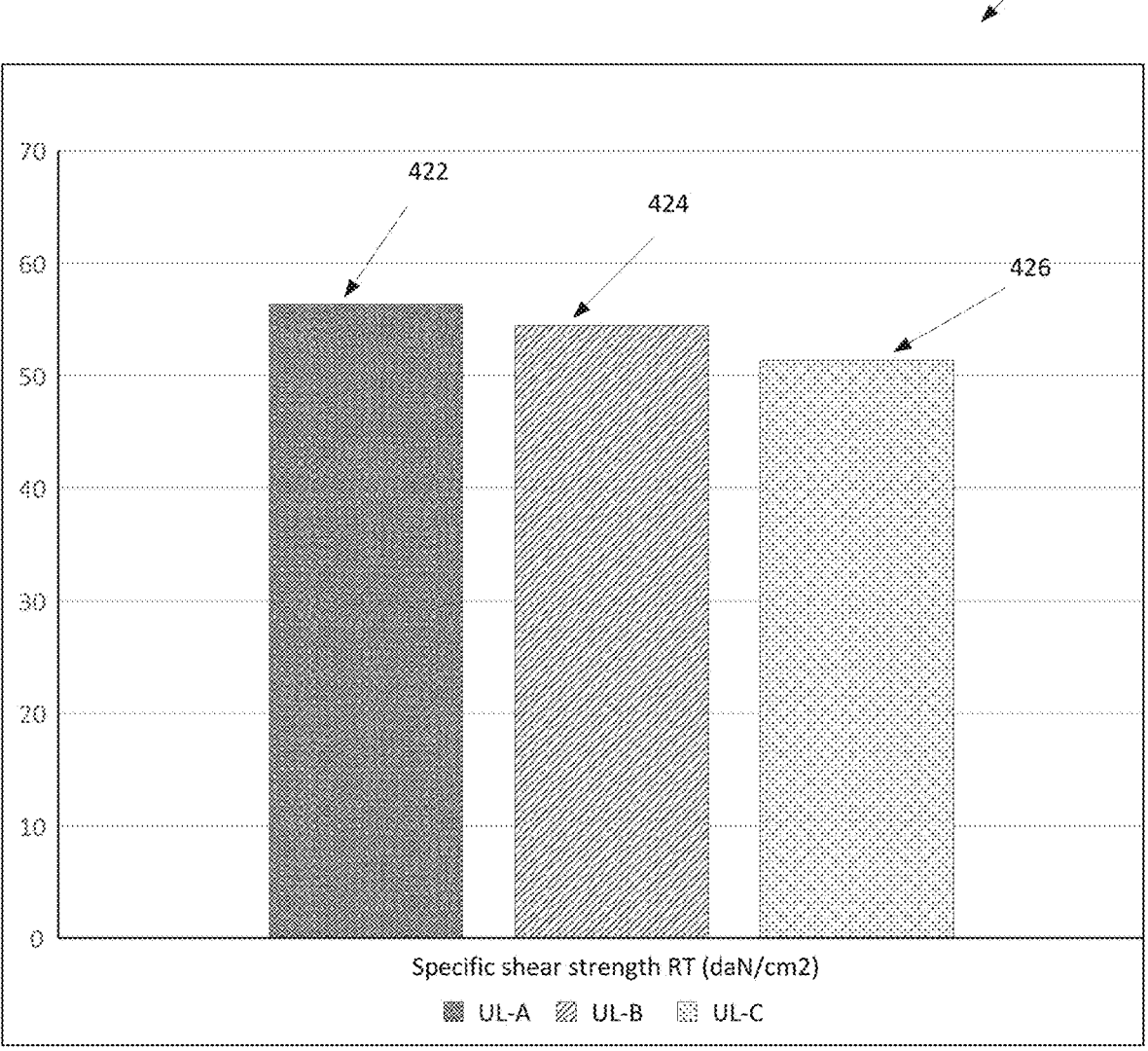
FIG. 4C is a graph illustrating specific shear strength of three different under-layers at room temperature.

FIG. 4C is a graph 420 illustrating specific shear strength $(daN/cm^2)$ of the three different under-layers at about room temperature. In the example, pads surface is 83.9 $cm^3$. The bar 422 is the specific shear strength of UL_A at about room temperature. The bar 424 is the specific shear strength of UL_B at about room temperature. The bar 426 is the specific shear strength of UL_C at about room temperature. The specific shear strength of the disclosed under-layer is comparable to the other two under-layers, illustrating that the low aramid fiber content has no significant impact on the physical properties of the disclosed under-layer. Table 5 is the summary of the thermo-mechanical properties of the three under-layers.

TABLE 5

| | UL_A | UL_B | UL_C |
|---|---|---|---|
| Shear strength RT (kN) | 47.3 | 45.7 | 43.05 |
| Shear strength 300° C. (kN) | 57.2 | 46.02 | 52.4 |
| Specific shear strength RT $(daN/cm^2)$ | 56.4 | 54.5 | 51.3 |

Figure 5A:
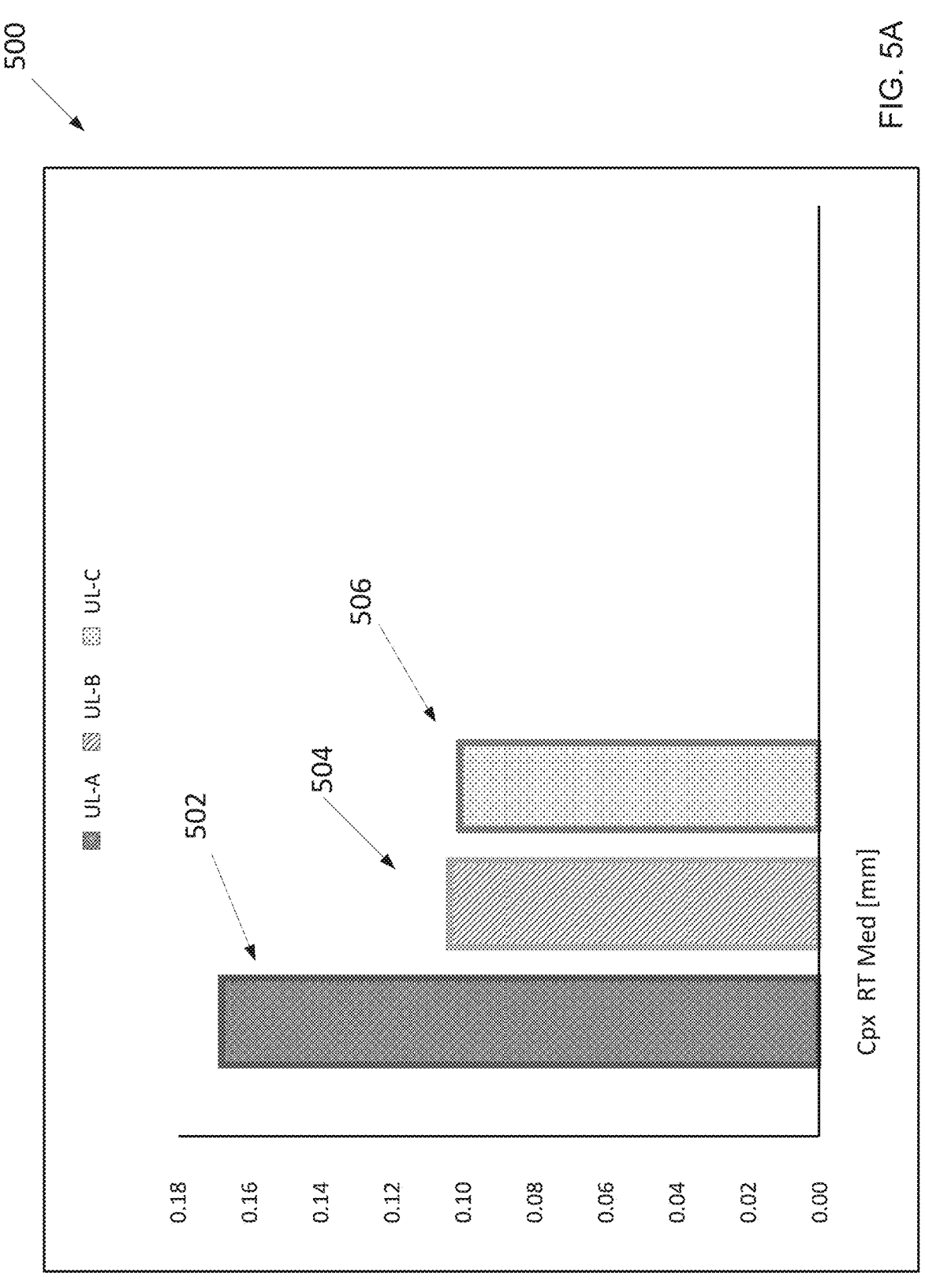
FIG. 5A is a graph illustrating compressibility of three different under-layers at room temperature.

FIG. 5A is a graph 500 illustrating compressibility of three different under-layers at about room temperature with a pressure of 100 bar. The compressibility is an important parameter to be considered for checking the noise vibration damping of an under-layer. The bar 502 is the compressibility of UL_A at about room temperature. The bar 504 is the compressibility of UL_B at about room temperature. The bar 506 is the compressibility of UL_C at about room temperature. As may be seen from the graph 500, the compressibility of UL_C is substantially the same as that of the UL_B, illustrating that the low aramid fiber content did not adversely impact the noise vibration damping of the disclosed under-layer.

Figure 5B:
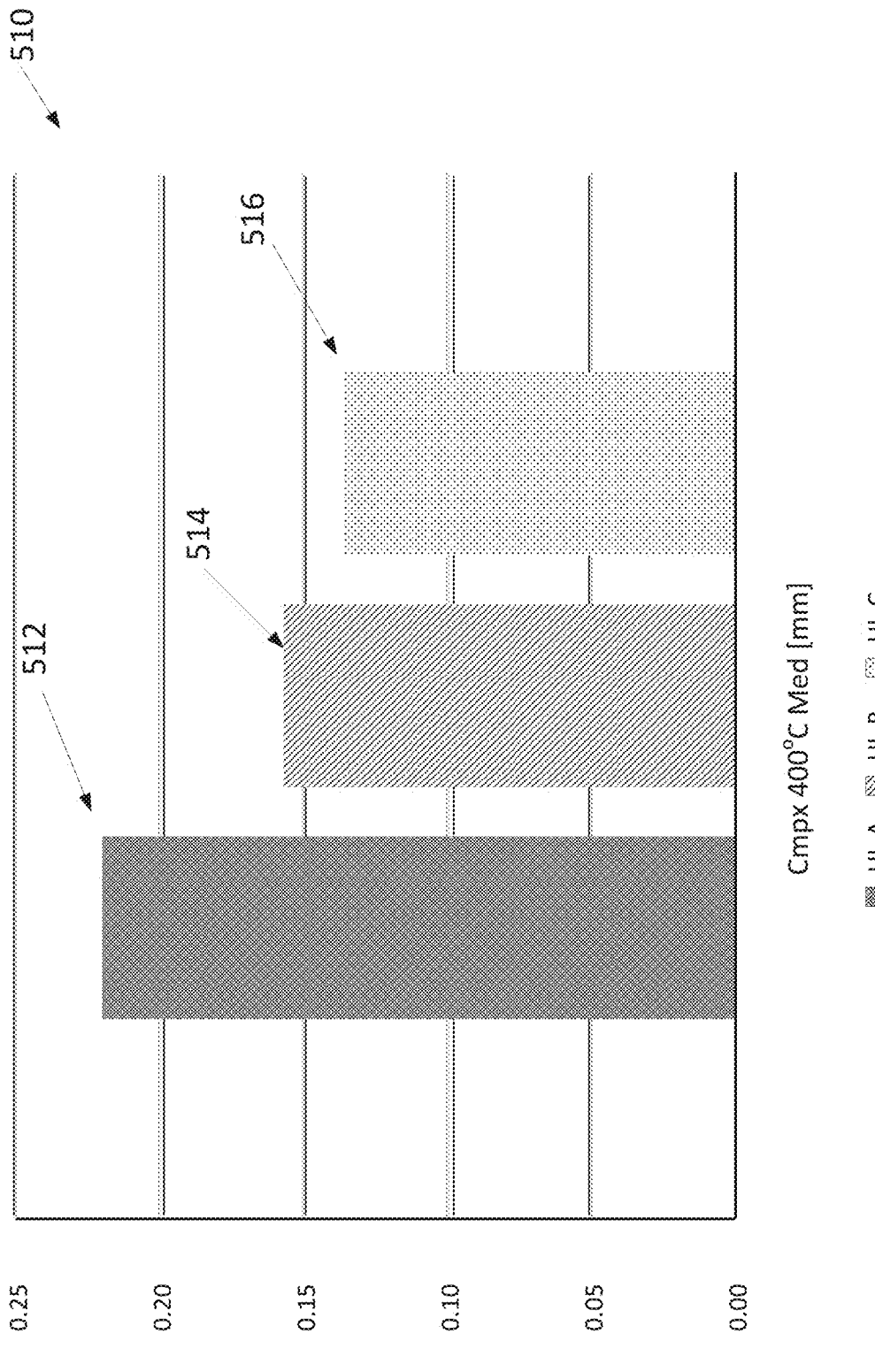
FIG. 5B is a graph illustrating compressibility of three different under-layers at a temperature of 400° C.

FIG. 5B is a graph 510 illustrating compressibility of three different under-layers at a temperature of about 400° C. with a pressure of 100 bar. The bar 512 is the compressibility of UL_A at a temperature of about 400° C. The bar 514 is the compressibility of UL_B at a temperature of about 400° C. The bar 516 is the compressibility of UL_C at a temperature of about 400° C. The compressibility of UL_C is slightly lower than that of UL_B at a temperature of about 400° C.

The noise pressure level of the UL_C is comparable to that of UL_A. The summary of the compressibility values at room temperature and 400° C. are represented in table 6

TABLE 6

|  | UL_A | UL_B | UL_C |
|---|---|---|---|
| Compressibility RT (mm) | 0.168 | 0.104 | 0.101 |
| Compressibility 400° C. (mm) | 0.22 | 0.157 | 0.136 |

Figure 6A:
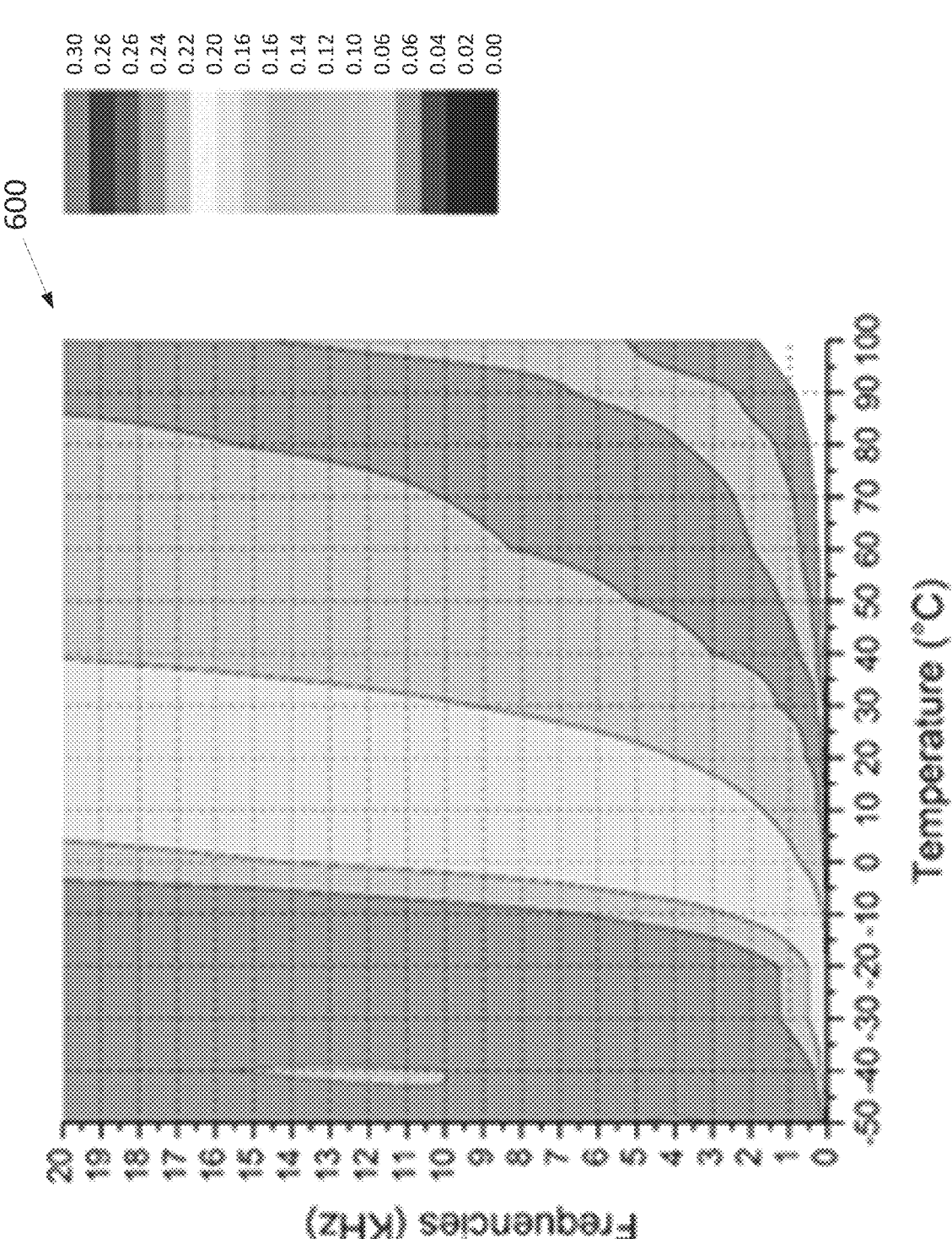
FIG. 6A illustrates a graph of a temperature-frequency response of an under-layer.
Figure 6B:
FIG. 6B illustrates a graph of a temperature-frequency response of another under-layer.
Figure 6C:
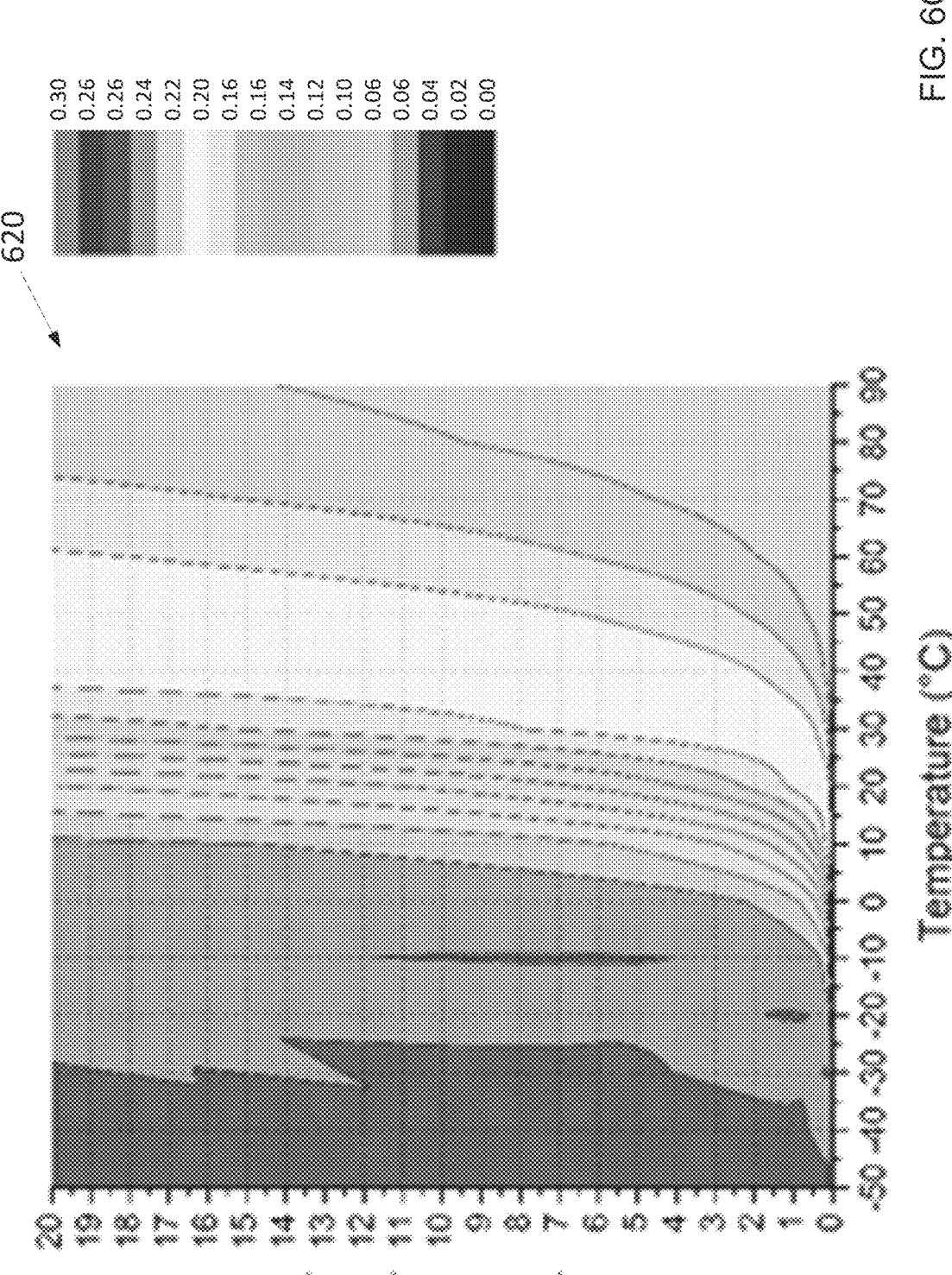
FIG. 6C illustrates a graph of a temperature-frequency response of yet another under-layer.

FIG. 6A through 6C illustrate graphs of temperature-frequency response of different under-layers.

The visco-elastic behavior of the example ULs has been studied by means of DMA (Dynamic Mechanical Analysis), following, the WLF theory and the time-temperature super-position principle were applied to create maps of frequency response towards sample temperature. This allows to create visual and numeric estimations of the damping properties of a composite material such as ULs. UL_A (graph 620 in FIG. 6C) shows the Krupp-based UL (UL_A) with a high vibration damping capacity mostly in the range on temperatures 20-40° C. UL_B (graph 610 in FIG. 6B) shows the Loedige UL (UL_B) with 10 wt % of aramid fiber with much lower damping capacity overall but with highest values in the temperatures 0-20° C. UL_C (graph 600 in FIG. 6A) shows the Loedige UL with low content of aramid fiber (less than 1% wt.) with lower damping capacity overall with respect to UL_A but higher than UL_B, with highest values in the temperatures 0-20° C. Ultimately, Loedige-based UL tend to have lower damping capacity than Krupp based, but the reduction of the aramid contend does not negatively affect damping properties of the Loedige-based UL.

Table 7 presents the results of NVH performance evaluation of the three under-layers. Pads produced with UL_A, UL_B, UL_C undergone a test procedure (norm FCA PF.90244) in a dynamometric bench equipped for NVH evaluations (Noise-Vibration-Harshness). The procedure involves braking test sections in both low and high temperature, the number of noisy braking events is evaluated and reported in Table 7. Surprisingly, both Loedige-based UL, UL_B and UL_C showed better or comparable performance as UL_A, showing that the new production methodology does not affect the ultimate purpose of noise damping during real application.

TABLE 7

|  | UL_A | UL_B | UL_C |
|---|---|---|---|
| Tot. Noise % | 11.8 | 8.6 | 5.7 |
| Hot Noise % | 12.0 | 5.8 | 4.4 |
| Cold Noise % | 11.4 | 18.6 | 10.2 |

Figure 7:
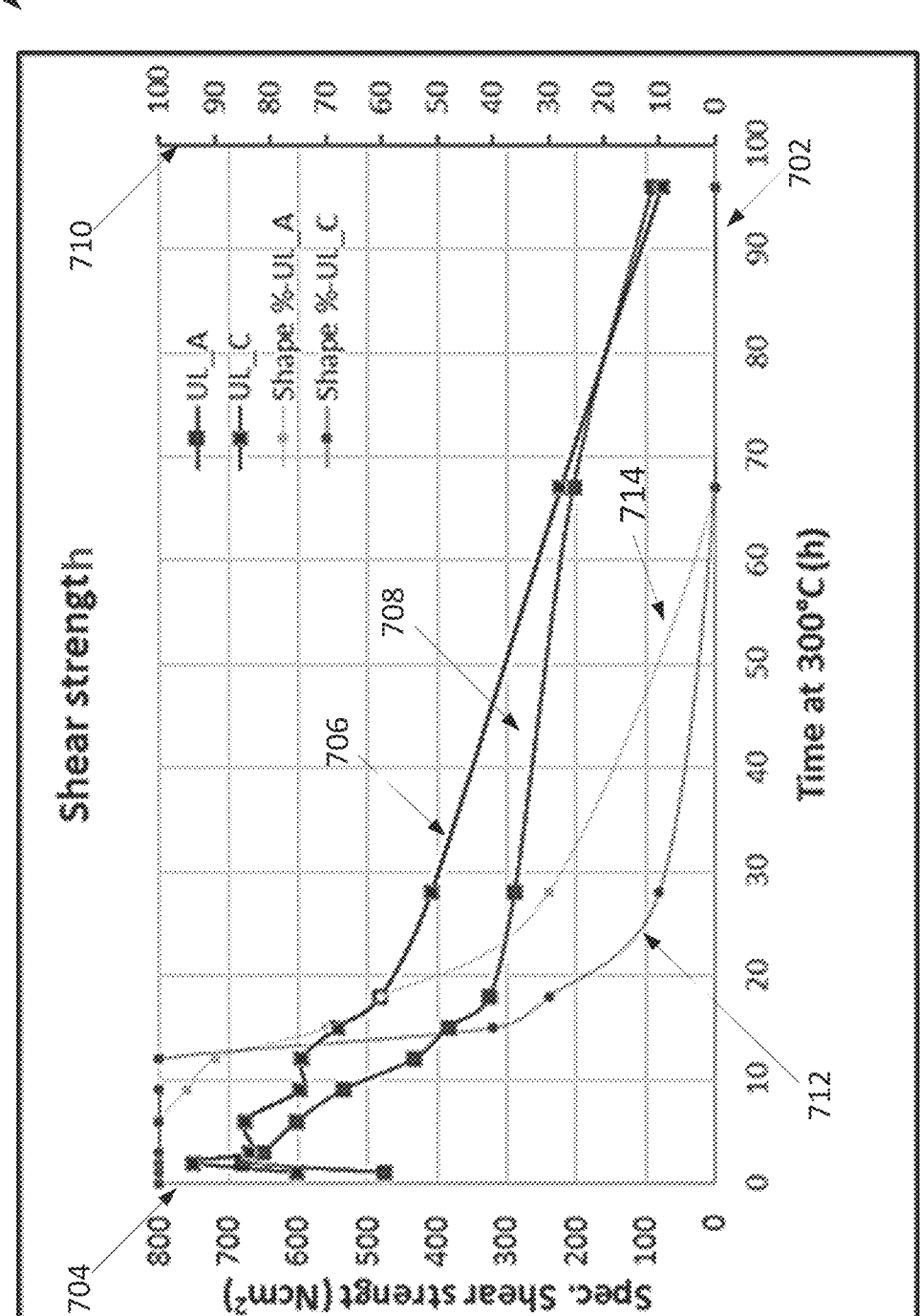
FIG. 7 is a graph illustrating a variation of specific shear strength and shape % with time at a temperature of 300° C. for two under-layers.

FIG. 7 includes graph 700 illustrating a variation of specific shear strength and shape % (percentage of UL actually removed with the shear detachment) with time at a temperature of about 300° C. for the under-layers UL_A and UL_C. In graph 700, the horizontal axis 702 represents time (hr.), the left vertical axis 704 represents specific shear strength (N/cm$^2$) for the shear strength curves 706 and 708 for UL_C and UL_A, respectively. As is evident from the curve 706, UL_C has a higher specific shear strength initially, which decreases at a lower rate till a time of about 65 hrs. as compared to that of UL_A as shown in curve 708.

In graph 700, the horizontal axis 702 represents time (hr.), the right vertical axis 710 represents shape % for the shape curves 712 and 714. The shape % of UL_C remains constant till a time of about 15 hrs. and then sharply decreases, till it reaches zero at a time of about 68 hrs. Thus, Loedige-based UL_C showed better or equal resistance to thermal degradation as standard UL_A. Both materials rapidly degrade after 20 h of test.

Figure 8:
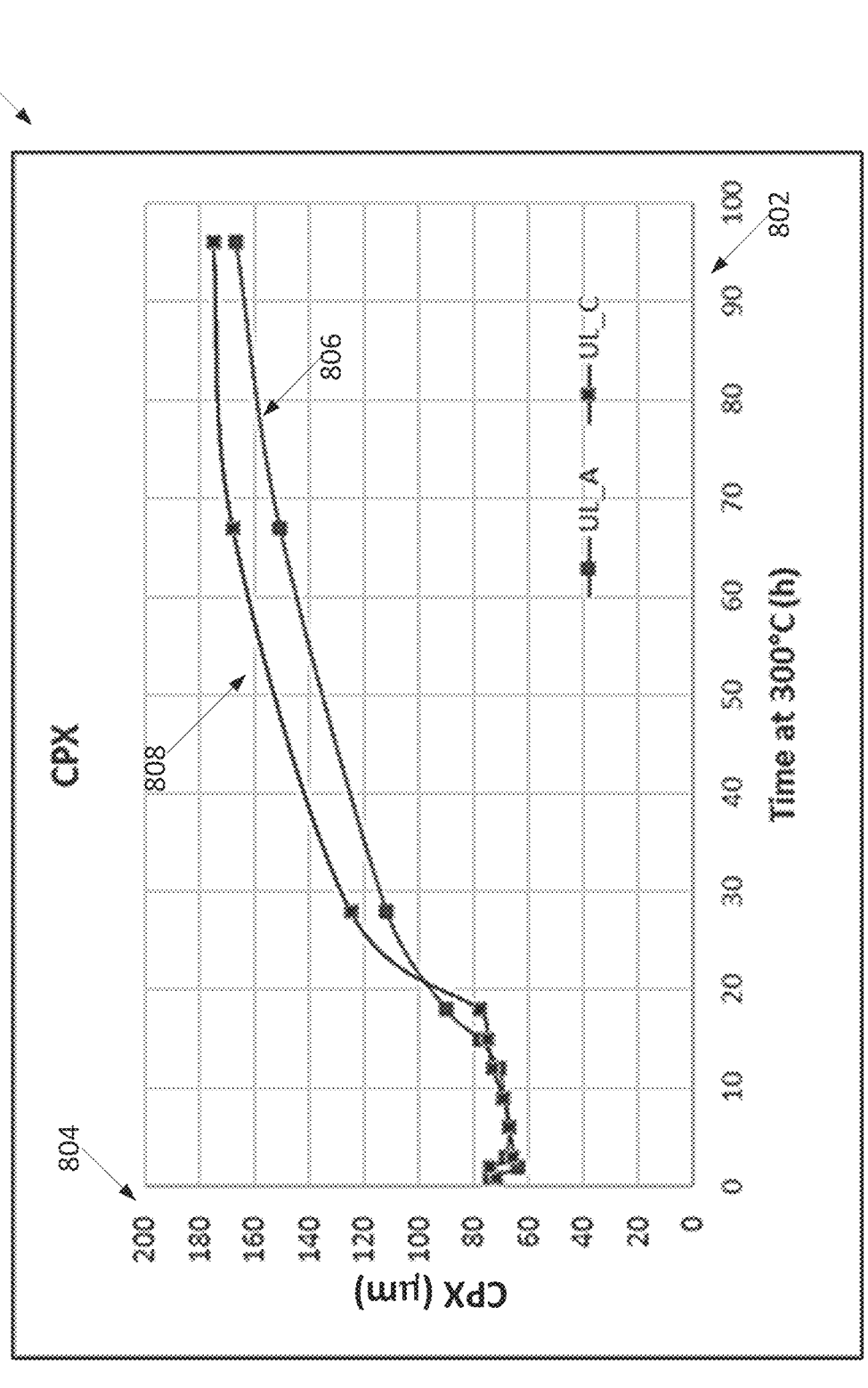
FIG. 8 is a graph illustrating a variation of compressibility with time at a temperature of 300° C. for two under-layers, arranged in accordance with at least some embodiments described herein.

FIG. 8 includes graph 800 illustrating a variation of compressibility with time at a temperature of 300° C. for two under-layers UL_A and UL_C, measured at 100 bar. In the graph 800, the horizontal axis 802 represents time (hr.), and the vertical axis 804 represents compressibility (μm) for the curves 806 and 808 for UL_C and UL_A, respectively. As is evident from the curve 806, UL_C compressibility grows progressively during the first 15 hrs of test time, showing a similar behavior of UL_A in curve 808. After 15-20 hrs of temperature exposure, both materials start to degrade while showing rising compressibility values.

EXAMPLES

The following examples are intended as illustrative and non-limiting and represent specific embodiments of the present disclosure. The examples show that the friction material is a general friction material in the non-asbestos organic (NAO) family with phenolic resin.

Example 1

Synthesis of UL_A

Table 2 presents the raw materials used for making the under-layer UL_A. The raw materials were mixed in the Krupp mixer and then milled and molded into a solid layer, forming UL_A.

Example 2

Synthesis of UL_B

Table 3 presents the raw materials used for making the under-layer UL_B. The raw materials were mixed in a Loedige and then molded into a solid layer, forming UL_B.

Example 3

Synthesis of UL_C

Table 4 presents the raw materials used for making the under-layer UL_C. The raw materials were mixed in the Loedige mixer and then molded into a solid layer, forming UL_C.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A composition for an under-layer of a brake pad, the composition comprising:
   a fiber pack comprising acrylic fibers in an amount of about 1 wt % to about 4 wt %, aramid fibers in an amount of about 0.5 wt % to less than 1 wt %, and inorganic mineral fibers in an amount of about 1 wt % to less than 3 wt %;
   a powdered rubber;
   at least one binder; and
   at least one filler, wherein the fiber pack, the powdered rubber, the at least one filler and the at least one binder are dry-mixed.

2. The composition of claim 1, wherein the acrylic fibers comprise acrylic poly acrylonitrile pulp (PAN), the aramid fibers comprise poly(p-phenylene terephthalamide) fibers (PPTA), and the inorganic mineral fibers comprise natural stonewool fibers.

3. The composition of claim 1, wherein the powdered rubber comprises from about 5 wt % to about 25 wt % of the composition, is compounded with an inorganic filler, and includes one or more of nitrile rubber (NBR), ethylene propylene rubber (EPM), ethylene propylene diene monomer rubber (EPDM), and styrene-butadiene rubber (SBR).

4. The composition of claim 1, wherein the powdered rubber has an average diameter in a range from about 0.3 mm to about 0.7 mm.

5. The composition of claim 1, wherein the at least one binder comprises a mixture of phenol-formaldehyde resins (PF Novolak) and Hexmethylene Tetramine (HMT).

6. The composition of claim 1, wherein the at least one filler comprises barium sulfate.

7. The composition of claim 1, further comprising an organic pigment phthalocyanine.

8. The composition of claim 1, further comprising steel fibers with an aspect ratio from about 20 to about 100.

9. The composition of claim 1, wherein when formed into the under-layer for the brake pad, the composition has a shear strength in a range of about 35 kN to about 60 kN after being exposed at a temperature of about 300° C. for 1 h.

10. The composition of claim 1, wherein when formed into the under-layer for the brake pad, the composition has a specific shear strength in a range of about 300 N/cm$^2$ to about 600 N/cm$^2$ at about room temperature.

11. The composition of claim 1, wherein when formed into the under-layer for the brake pad, the composition has a compressibility in a range of about 0.08 mm to about 0.12 mm at about room temperature with a pressure of 100 bar.

12. The composition of claim 1, wherein when formed into the under-layer for the brake pad, the composition has a compressibility in a range of about 0.13 mm to about 0.15 mm at a temperature of about 400° C. with a pressure of 100 bar.

\* \* \* \* \*